(12) United States Patent
Banthia (10) Patent No.: US 9,647,802 B2
(45) Date of Patent: May 9, 2017

(54) SYSTEMS AND METHODS FOR MITIGATING EFFECTS OF AN UNRESPONSIVE SECURE ELEMENT

(71) Applicant: QUALCOMM Incorporated, San Diego, CA (US)

(72) Inventor: Ashish Banthia, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 157 days.

(21) Appl. No.: 14/515,319

(22) Filed: Oct. 15, 2014

(65) Prior Publication Data

US 2016/0112159 A1  Apr. 21, 2016

(51) Int. Cl.
| | | |
|---|---|---|
| G08C 25/02 | (2006.01) | |
| H04L 1/08 | (2006.01) | |
| G06F 11/07 | (2006.01) | |
| H04L 1/18 | (2006.01) | |
| G06Q 20/32 | (2012.01) | |
| H04N 19/172 | (2014.01) | |
| H04N 19/102 | (2014.01) | |
| H04N 19/166 | (2014.01) | |
| H04N 19/89 | (2014.01) | |

(52) U.S. Cl.
CPC ............. *H04L 1/08* (2013.01); *G06F 11/076* (2013.01); *G06F 11/0793* (2013.01); *G06Q 20/327* (2013.01); *H04L 1/1887* (2013.01); *H04N 19/102* (2014.11); *H04N 19/166* (2014.11); *H04N 19/172* (2014.11); *H04N 19/89* (2014.11)

(58) Field of Classification Search
None
See application file for complete search history.

(56) References Cited

U.S. PATENT DOCUMENTS

| | | | |
|---|---|---|---|
| 6,868,067 B2 | 3/2005 | Rostron | |
| 7,697,491 B2 * | 4/2010 | Nakajima | ............. H04L 1/1887 370/231 |
| 7,978,669 B2 | 7/2011 | Kumar et al. | |
| 8,009,567 B2 | 8/2011 | Dattagupta et al. | |
| 2014/0006784 A1 | 1/2014 | Walker et al. | |
| 2014/0136401 A1 | 5/2014 | Smythe | |

FOREIGN PATENT DOCUMENTS

CN        103440075 A        12/2013

OTHER PUBLICATIONS

International Search Report and Written Opinion—PCT/US2015/050797—ISA/EPO—Dec. 2, 2015.
"Smart Cards: UICC—Contactless Front-end (CLF) Interface; Part 1: Physical and data link layer characteristics (Release 11)," ETSI TS 102 613, V11.0.0, Sep. 2012, pp. 1-57.

* cited by examiner

*Primary Examiner* — Daniel McMahon
(74) *Attorney, Agent, or Firm* — Austin Rapp & Hardman (57) ABSTRACT

A method includes counting a number of successive information frame (I-frame) retransmissions due to a guard timer expiring. A contactless front-end (CLF) transmits the I-frame to a secure element (SE) over a single wire protocol (SWP) interface. The method also includes discontinuing I-frame retransmission when the count equals a retransmission threshold. The method further includes deactivating the SWP interface.

28 Claims, 8 Drawing Sheets

SYSTEMS AND METHODS FOR MITIGATING EFFECTS OF AN UNRESPONSIVE SECURE ELEMENT

TECHNICAL FIELD

The present disclosure relates generally to electronic devices. More specifically, the present disclosure relates to systems and methods for mitigating effects of an unresponsive secure element (SE).

BACKGROUND

The use of electronic devices has become common. In particular, advances in electronic technology have reduced the cost of increasingly complex and useful electronic devices. Cost reduction and consumer demand have proliferated the use of electronic devices such that they are practically ubiquitous. And, as the use of electronic devices has expanded, so has the demand for new and improved features for them. More specifically, electronic devices that perform new functions and/or perform faster, more efficiently, or with higher quality are often in high demand.

Some electronic devices (e.g., smartphones) transmit wireless signals. Wireless signals may, for example, be utilized to communicate with other electronic devices and, in some cases, convey information related to a secure transaction. Some electronic devices include one or more secure elements (SE) that store information for a secure transaction. However, an SE may become unresponsive while communicating with the electronic device. System and methods for mitigating effects of an unresponsive SE may be beneficial.

SUMMARY

A method is described. The method includes counting a number of successive information frame (I-frame) retransmissions due to a guard timer expiring. A contactless front-end (CLF) transmits the I-frame to a secure element (SE) over a single wire protocol (SWP) interface. The method also includes discontinuing I-frame retransmission when the count equals a retransmission threshold. The method further includes deactivating the SWP interface.

Counting the number of successive I-frame retransmissions may include incrementing the count for each successive I-frame retransmission. The count may be reset to zero when the SE acknowledges an I-frame.

The retransmission threshold may be configurable. The guard timer may expire when the CLF fails to receive an I-frame acknowledgement from the SE within a guarding time. The I-frame may be sent over the SWP interface using simplified high level data link control (SHDLC) link layer control (LLC).

The method may also include triggering an interrupt of the CLF firmware. The method may further include notifying the CLF firmware of an unresponsive SE condition.

The method may also include maintaining multiple counts associated with multiple I-frames that are transmitted by the CLF to the SE. Each I-frame may have a separate count for the number of successive I-frame retransmissions due to a guard timer expiring. The method may further include discontinuing I-frame retransmission and deactivating the SWP interface when at least one of the multiple counts equals the retransmission threshold. The method may also include resetting the multiple counts to zero when the SE acknowledges any one of the multiple I-frames.

The CLF may be a near-field communication (NFC) chip. The SE may include at least one of a universal integrated circuit card (UICC) and an embedded SE.

An electronic device is also described. The electronic device includes a processor, memory in electronic communication with the processor, and instructions stored in the memory. The instructions are executable by the processor to maintain a counter that counts the number of successive I-frame retransmissions due to a guard timer expiring. A CLF transmits the I-frame to an SE over an SWP interface. The instructions are also executable to discontinue I-frame retransmission when the counter equals a retransmission threshold. The instructions are further executable to deactivate the SWP interface.

The instructions executable to maintain the counter that counts the number of successive I-frame retransmissions may include instructions executable to increment the counter for each successive I-frame retransmission. The instructions may also be executable to reset the counter to zero when the SE acknowledges an I-frame.

The instructions may also be executable to trigger an interrupt of the CLF firmware. The instructions may be further executable to notify the CLF firmware of an unresponsive SE condition.

The instructions may also be executable to maintain multiple counters associated with multiple I-frames that are transmitted by the CLF to the SE. Each I-frame may have a separate counter that counts the number of successive I-frame retransmissions due to a guard timer expiring. The instructions may be further executable to discontinue I-frame retransmission and deactivate the SWP interface when at least one of the multiple counters equals the retransmission threshold. The instructions may be executable to reset the multiple counters to zero when the SE acknowledges any one of the multiple I-frames.

An apparatus is also described. The apparatus includes means for counting the number of successive I-frame retransmissions due to a guard timer expiring. A CLF transmits the I-frame to an SE over an SWP interface. The apparatus also includes means for discontinuing I-frame retransmission when the count equals a retransmission threshold. The apparatus further includes means for deactivating the SWP interface.

A computer-program product is also described. The computer-program product includes a non-transitory computer-readable medium having instructions thereon. The instructions include code for causing an electronic device to count the number of successive I-frame retransmissions due to a guard timer expiring. A CLF transmits the I-frame to an SE over an SWP interface. The instructions also include code for causing the electronic device to discontinue I-frame retransmission when the count equals a retransmission threshold. The instructions further include code for causing the electronic device to deactivate the SWP interface.

DETAILED DESCRIPTION

The systems and methods disclosed herein may be applied to communication devices that communicate wirelessly and/or that communicate using a wired connection or link. For example, some communication devices may communicate with other devices using an Ethernet protocol. In another example, some communication devices may communicate with other devices using wireless communication. In one configuration, the systems and methods disclosed herein may be applied to a communication device that communicates with another device using an induction-based communication technology. One implementation of inductively coupled communication technology is near-field communication (NFC).

An electronic device may include an NFC chip (also referred to as an NFC card, NFC controller chip, NFC controller, etc.). The direction for the data flow in the NFC communication standards is characterized by having a first device (also referred to as a poller, polling device, proximity coupling device (PCD) or initiator) provide an electromagnetic field (also referred to as an RF-field). A second device (also referred to as a listener, listening device, proximity integrated circuit card (PICC) or target) may be inductively coupled to the magnetic field and may exchange data via the magnetic field.

In one implementation of NFC, an electronic device may perform contactless payment services. In this implementation, the electronic device may act as a credit card. This RF-based contactless payment approach may be appealing to users because of its ease of use. For example, users may benefit from increased speed, control of transactions and using the electronic device instead of cash. Multiple NFC applications may be supported by an electronic device. These NFC applications may include credit/debit payment, public transport ticketing, and loyalty and service initiation.

Security is an important consideration with NFC. Retail and transit payments with an electronic device (e.g., a mobile phone) entails wireless carriers, retailers, transport providers and banks to all work together. All of the transaction and payment card accounts information may be kept secure and apart. For this reason, NFC may use a secure element (SE) to store sensitive information such as credit card account numbers, transit accounts, and mobile phone details.

The NFC chip may establish a communication interface with the SE to pass information from the SE to a remote device via the NFC chip or to be used within the electronic device itself. In one configuration, this interface may be a single wire protocol (SWP) interface. However, while communicating, the SE may become unresponsive. Therefore, systems and methods for mitigating effects of an unresponsive secure element (SE) may be beneficial.

Various configurations are now described with reference to the Figures. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
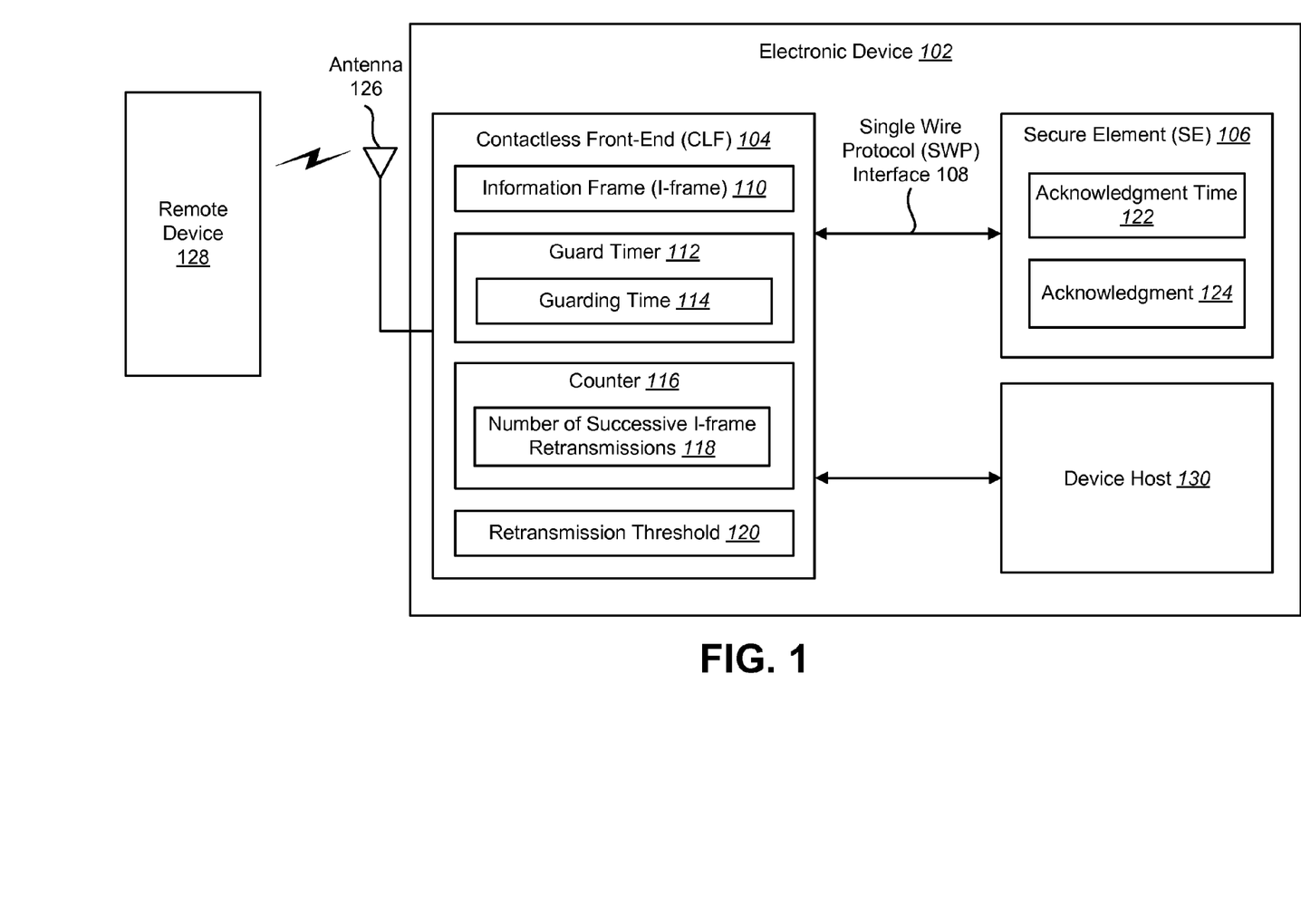
FIG. 1 is a block diagram illustrating one configuration of an electronic device in which systems and methods for mitigating effects of an unresponsive secure element (SE) may be implemented.

FIG. 1 is a block diagram illustrating one configuration of an electronic device 102 in which systems and methods for mitigating effects of an unresponsive secure element (SE) 106 may be implemented. Examples of electronic devices 102 include wireless communication devices, cellular phones, smartphones, tablet devices, voice recorders, digital cameras, still cameras, camcorders, gaming systems, laptop computers, etc. Each component of the electronic device 102 described herein may be implemented in hardware (e.g., circuitry) or a combination of hardware and software (e.g., a processor with executable instructions stored in memory).

In some scenarios, electronic device 102 may perform contactless payment services. Multiple applications may be supported by the electronic device 102. For example, these applications may include credit/debit payment, public transport ticketing, and loyalty and service initiation.

The electronic device 102 may include a contactless front-end (CLF) 104. In one configuration, the CLF 104 may be a near-field communication (NFC) chip. The CLF 104 may communicate with a remote device 128 via an antenna 126. For example, the CLF 104 may perform inductively coupled communication with the remote device 128. The CLF 104 may establish an interface between a device host 130 (also referred to as an application processor). In the case of NFC, the interface between the device host 130 and the CLF 104 may be an NFC controller interface (NCI).

The electronic device 102 may include at least one secure element (SE) 106. The SE 106 may be removable or embedded. Examples of a removable SE 106 include a subscriber identity module (SIM) card or a universal integrated circuit card (UICC). An embedded SE 106 may be integrated into the electronic device 102. The SE 106 may store sensitive information. For example, the SE 106 may store credit card account numbers, transit accounts, and mobile phone details. To enable proximity payments, the SE 106 may authenticate itself to a bank, and may be resistant to physical or logical attack.

The CLF 104 may activate a single wire protocol (SWP) interface 108 with the SE 106. In one configuration, the SWP interface 108 is a serial interface that can support full duplex transmission between the CLF 104 and the SE 106. The SWP interface 108 is described in more detail in connection with FIG. 3.

Upon activating the SWP interface 108, the CLF 104 may establish a simplified high level data link control (SHDLC) link with the SE 106. The SHDLC layer is responsible for the error-free transmission of data between the CLF 104 and the SE 106. Once the SWP interface 108 is activated and the SHDLC link is established, the CLF 104 and the SE 106 may exchange data payloads using the SHDLC link layer control (LLC).

When using SHDLC LLC, an endpoint (e.g., the CLF 104 or the SE 106) can send data in a frame. One type of frame that may be exchanged between the CLF 104 and the SE 106 is an information frame (I-frame) 110. Other types of frames include supervisory frames (S-frames) and unnumbered frames (U-frames).

An I-frame 110 may carry upper-layer information and some control information. I-frame 110 functions may include sequencing, flow control, error detection and recovery. I-frames 110 may also carry send and receive sequence numbers. Both the S-frame and the U-frame may carry control information. Therefore, to exchange payload data (e.g., upper-layer information), the CLF 104 and the SE 106 may include the payload data in an I-frame 110.

In one configuration, a maximum of 29 bytes of payload may be included in an I-frame 110. For a payload that is larger than 29 bytes, the payload may be fragmented and sent over multiple I-frames 110. For example, there are cases where the payload may be in excess of 200 bytes, which may be split into 7 or more I-frames 110.

To ensure that the data is received at the other end properly, there is a guard timer 112 associated with every I-frame 110 that is sent by any endpoint. The guard timer 112 may have a guarding time 114 (also referred to as T2, guard time or a transmit time). The guarding time 114 may be configurable. If an I-frame 110 is not acknowledged within the guarding time 114, an endpoint (i.e., the CLF 104 or SE 106) may retransmit these I-frames 110. The guarding time 114 defines the time to wait after sending an I-frame 110 and retransmitting the I-frame 110. The guarding time 114 may be defined from the last bit of the end of frame (EOF) of the not acknowledged I-frame 110 to the first bit of the start of frame (SOF) of the retransmitted I-frame 110. The corresponding guard timer 112 is disabled and reset when an acknowledgment 124 is received from the other endpoint.

If an endpoint sends an I-frame 110, the other endpoint should acknowledge the I-frame 110 within an acknowledge time 122 (T1). For example, if the guarding time 114 is 10 milliseconds (ms), the acknowledgment time 122 may be less than the guarding time 114 (e.g., T1<T2) by at least 5 ms so the endpoint that sent the I-frame 110 should receive an acknowledgement 124 before the guard timer 112 expires.

However, in certain cases, an endpoint may not receive an acknowledgment 124 within the guarding time 114. In a first case, the sent I-frame 110 may be corrupted or lost and the other endpoint never received it properly.

In a second case, the other endpoint received the I-frame 110 properly and sent the corresponding acknowledgement 124 but the acknowledgement 124 got corrupted or lost over the SWP interface 108. In this second case, the endpoint that sent the I-frame 110 may never receive a good acknowledgement 124 or anything at all.

In a third case, the receiving SE 106 may become unresponsive after receiving an I-frame 110 but before sending the acknowledgment 124. In one scenario, a removable SE 106 (e.g., a SIM card or UICC card) may be removed abruptly by the user after the SE 106 received the I-frame 110 but before it could send the acknowledgment 124. In this scenario, there is now no endpoint. Most mobile phones have SIM slots designed such that the SIM card (i.e., the SE 106) can be pulled out while the phone is powered on. A user could potentially pull the SE 106 out after the CLF 104 sends an I-frame 110 and before the SE 106 gets a chance to respond with an acknowledgment 124. In such a scenario, the CLF 104 has no way of detecting that the SE 106 on the other end has been disconnected.

In another scenario, the SE 106 may become unresponsive by locking up. This may occur due to software or hardware failures. For example, I-frames 110 may get corrupted if the line is very noisy. The SE 106 may keep detecting noise, but may think the noise is an I-frame 110 and may never find an actual I-frame 110. The SE 106 may also lock up based on how good the SWP interface 108 line is. Therefore, the SE 106 may still be in the electronic device 102, but it may stop responding. In this scenario, the SE 106 may be considered as not present.

The first and second cases are handled quite well if both endpoints behave as per specifications. In the first and second cases, both the endpoints are present and as long as the interface is mostly clean the endpoints will collectively come out of the situation and will be able to make reliable data exchange. However, the third case is unique in that only one endpoint (i.e., the CLF 104) is present and it keeps trying without any clue that the other endpoint (i.e., SE 106) is no longer connected. This may result in the retransmitting endpoint consuming power and going out of sync.

The third case is not addressed properly by the specifications. According to the European Telecommunications Standards Institute (ETSI) TS 102613, the CLF 104 is supposed to retransmit the I-frame 110 after the guard timer 112 expires in order to re-transmit the corresponding I-frame 110 so that the targeted endpoint receives it properly.

The specification does not give any guidelines on how many times the CLF 104 should try to resend the I-frames 110 before it quits. This is especially problematic if the third case mentioned above occurs. In the third case, the CLF 104 may enter an infinite loop and may continually retransmit the I-frame 110 upon expiration of the guard timer 112. The CLF 104 will endlessly keep retransmitting I-frame(s) 110 after the guard timer 112 timeouts and may not communicate properly when the SE 106 is eventually inserted back into the SIM slot or becomes responsive. This may result in wasted SWP interface 108 resources, wasted power, and the CLF 104 may not be able to exit this loop. Furthermore, this may result in a diminished user experience as the features of CLF 104 may appear to not be working.

To mitigate the effects of an unresponsive SE 106, the electronic device 102 may maintain a counter 116 that counts the number of successive I-frame retransmissions 118 due to the guard timer 112 expiring. The counter 116 may be included in the CLF 104 (as shown) or may be included in another block or module of the electronic device 102. When the guard timer 112 expires, the counter 116 may increment for each successive I-frame 110 retransmission. In one configuration, the counter 116 may increment before retransmitting the I-frame 110. In another configuration, the counter 116 may increment after retransmitting the I-frame 110. If the SE 106 acknowledges an I-frame 110, the counter 116 may be reset to zero.

The CLF 104 may compare the number of successive I-frame retransmissions 118 to a retransmission threshold 120. If the number of successive I-frame retransmissions 118 is less than the retransmission threshold 120, the CLF 104 may continue to retransmit the I-frame 110 and wait for the guard timer 112 to expire. If the number of I-frame retransmissions 118 equals the retransmission threshold 120, the CLF 104 may discontinue I-frame 110 retransmission when the counter 116 equals the retransmission threshold 120. In other words, when the counter 116 reaches the retransmission threshold 120, the CLF 104 may stop retransmitting the I-frame 110.

The retransmission threshold 120 may be configurable. The CLF 104 may retry the retransmission of an I-frame 110 pending acknowledgment 124 'n' times, where n is any positive integer. Therefore, the value of the retransmission threshold 120 may be defined as n+1.

The CLF 104 may deactivate the SWP interface 108 when the counter 116 equals the retransmission threshold 120. If the counter 116 reaches the retransmission threshold 120, this may indicate that the SE 106 has become unresponsive. In one configuration, the CLF 104 may interrupt the CLF firmware. The CLF 104 may notify the CLF firmware of an unresponsive SE condition. The CLF 104 may then deactivate the SWP interface 108.

The systems and methods described herein will enable the CLF 104 to detect that the SE 106 on the other end is not replying after a few tries because the SE 106 may have been removed or is in a bad state. The described systems and methods provide a mechanism to avoid an infinite loop caused by an unresponsive SE 106. This may improve user experience. The described systems and methods may also save power by avoiding the infinite loop.

Figure 2:
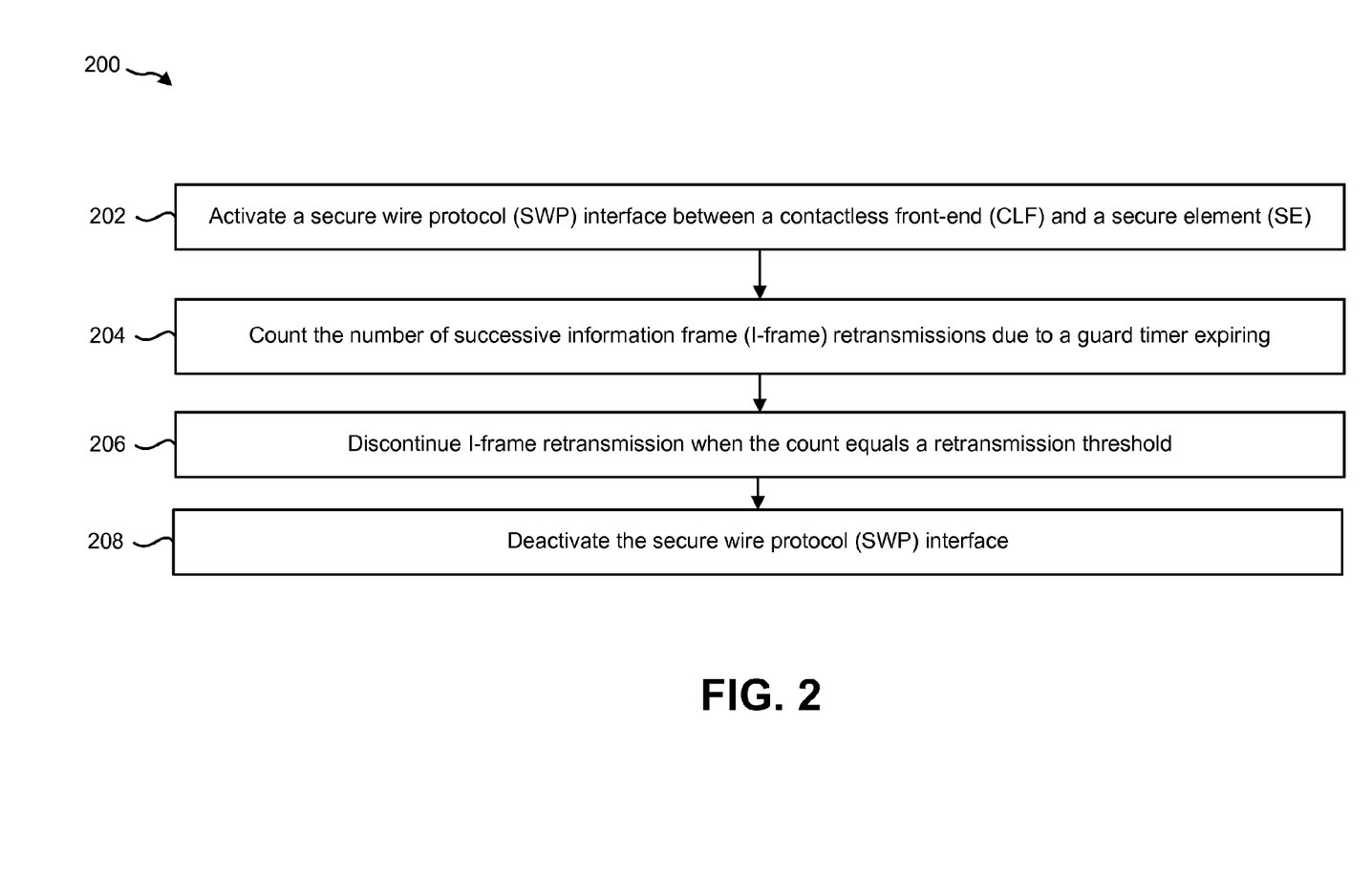
FIG. 2 is a flow diagram illustrating a method for mitigating effects of an unresponsive SE.

FIG. 2 is a flow diagram illustrating a method 200 for mitigating effects of an unresponsive SE 106. The method 200 may be implemented by a contactless front-end (CLF) 104. In one configuration, the CLF 104 may be an NFC chip. The CLF 104 may activate 202 a single wire protocol (SWP) interface 108 with the SE 106. The CLF 104 may then establish an SHDLC link with the SE 106.

The CLF 104 may send one or more I-frames 110 to the SE 106. The I-frame 110 may carry payload data to the SE 106. Upon sending an I-frame 110, the CLF 104 may start a guard timer 112. The guard timer 112 is disabled and reset when an acknowledgment 124 is received from the SE 106. If the I-frame 110 is not acknowledged within the guarding time 114, the CLF 104 may retransmit these I-frames 110. The guarding time 114 may be configurable.

The CLF 104 may count 204 the number of successive I-frame retransmissions due to the guard timer 112 expiring. For example, when the guard timer 112 expires, a counter 116 may increment. In other words, the number of successive I-frame retransmissions 118 may increase by one. If the SE 106 acknowledges an I-frame 110, the counter 116 may be reset to zero.

The CLF 104 may discontinue 206 I-frame 110 retransmission when the count equals a retransmission threshold 120. For example, the CLF 104 may compare the number of successive I-frame retransmissions 118 (as indicated by the counter 116) to the retransmission threshold 120. If the number of successive I-frame retransmissions 118 is less than the retransmission threshold 120, the CLF 104 may continue to retransmit the I-frame 110, restart the guard timer 112 and wait for the guard timer 112 to expire. When the count reaches the retransmission threshold 120, the CLF 104 may stop retransmitting the I-frame 110.

The retransmission threshold 120 may be configurable. The CLF 104 may retry the retransmission of an I-frame(s) 110 pending acknowledgment 124 'n' times, where n is any positive integer. Therefore, the value of the retransmission threshold 120 may be defined as n+1.

The CLF 104 may deactivate 208 the SWP interface 108 when the count equals the retransmission threshold 120. For example, if the counter 116 reaches the retransmission threshold 120, this may indicate that the SE 106 has become unresponsive. In one configuration, the CLF 104 may interrupt the CLF firmware. The CLF 104 may notify the CLF firmware of an unresponsive SE condition. The CLF 104 may then deactivate the SWP interface 108.

Figure 3:
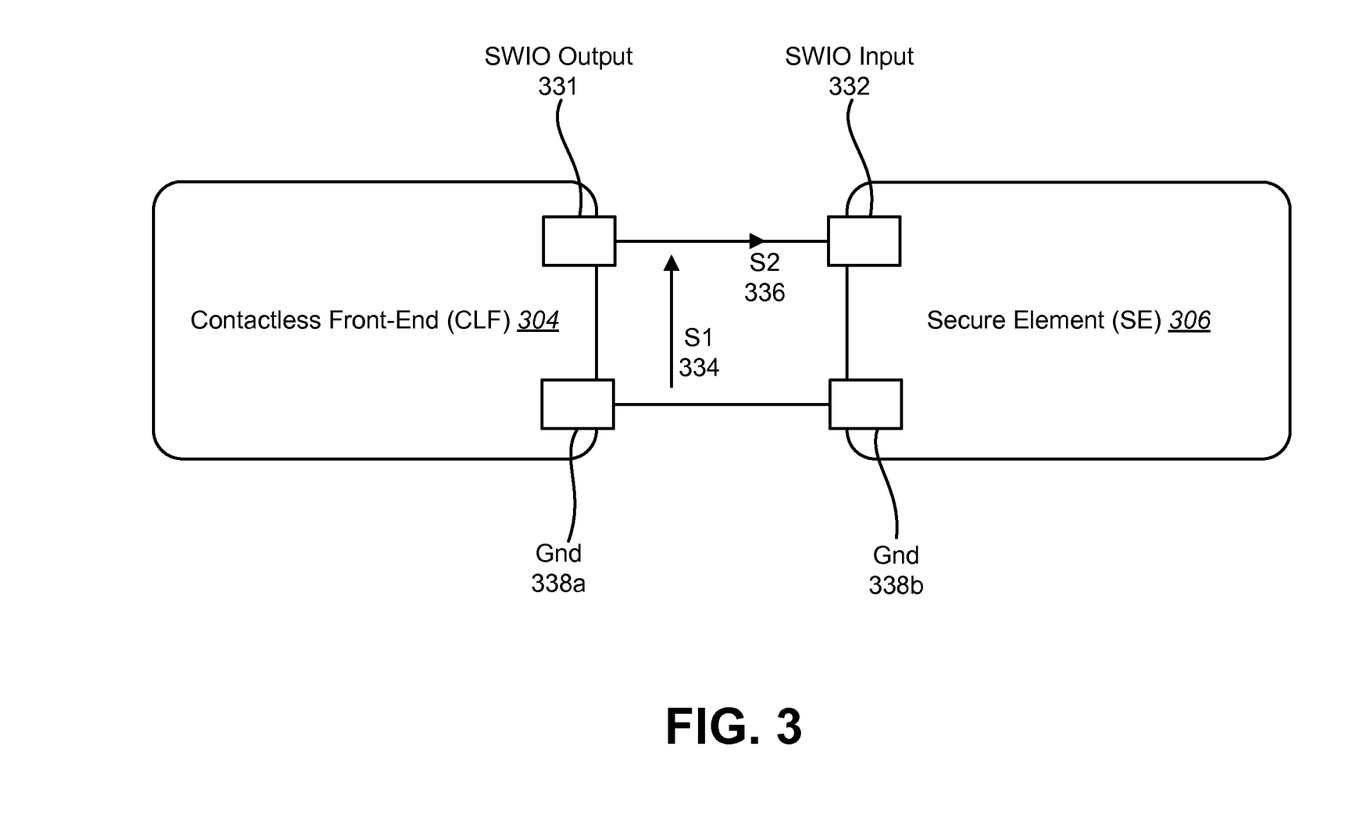
FIG. 3 is a block diagram illustrating one configuration of a single wire protocol (SWP) interface.

FIG. 3 is a block diagram illustrating one configuration of a single wire protocol (SWP) interface 308. A CLF 304 may activate an SWP interface 308 with an SE 306. The SWP interface 308 may be a bit-oriented, point-to-point communication protocol between the CLF 304 and the SE 306. In one configuration the CLF 304 may be the master and the SE 306 may be the slave.

The CLF 304 may include a single wire protocol input/output (SWIO) output 331 that is coupled to a SWIO input 332 of the SE 306. Each of the CLF 304 and the SE 306 may be wired to ground (gnd 338*a*-*b*).

The principle of the SWP interface 308 is based on the transmission of digital information in full duplex mode. A signal S1 334 may be transmitted by a digital modulation (e.g., low (L) or high (H) electrical level) in the voltage domain. A signal S2 336 may be transmitted by a digital modulation (e.g., low or high electrical level) in the current domain.

When the CLF 304 sends S1 334 as state H, then the SE 306 may either draw a current (state H) or not (state L) and thus transmit S2 336. With pulse width modulation bit coding of S1 334, it is possible to transmit a transmission clock, as well as data in full duplex mode.

Figure 4:
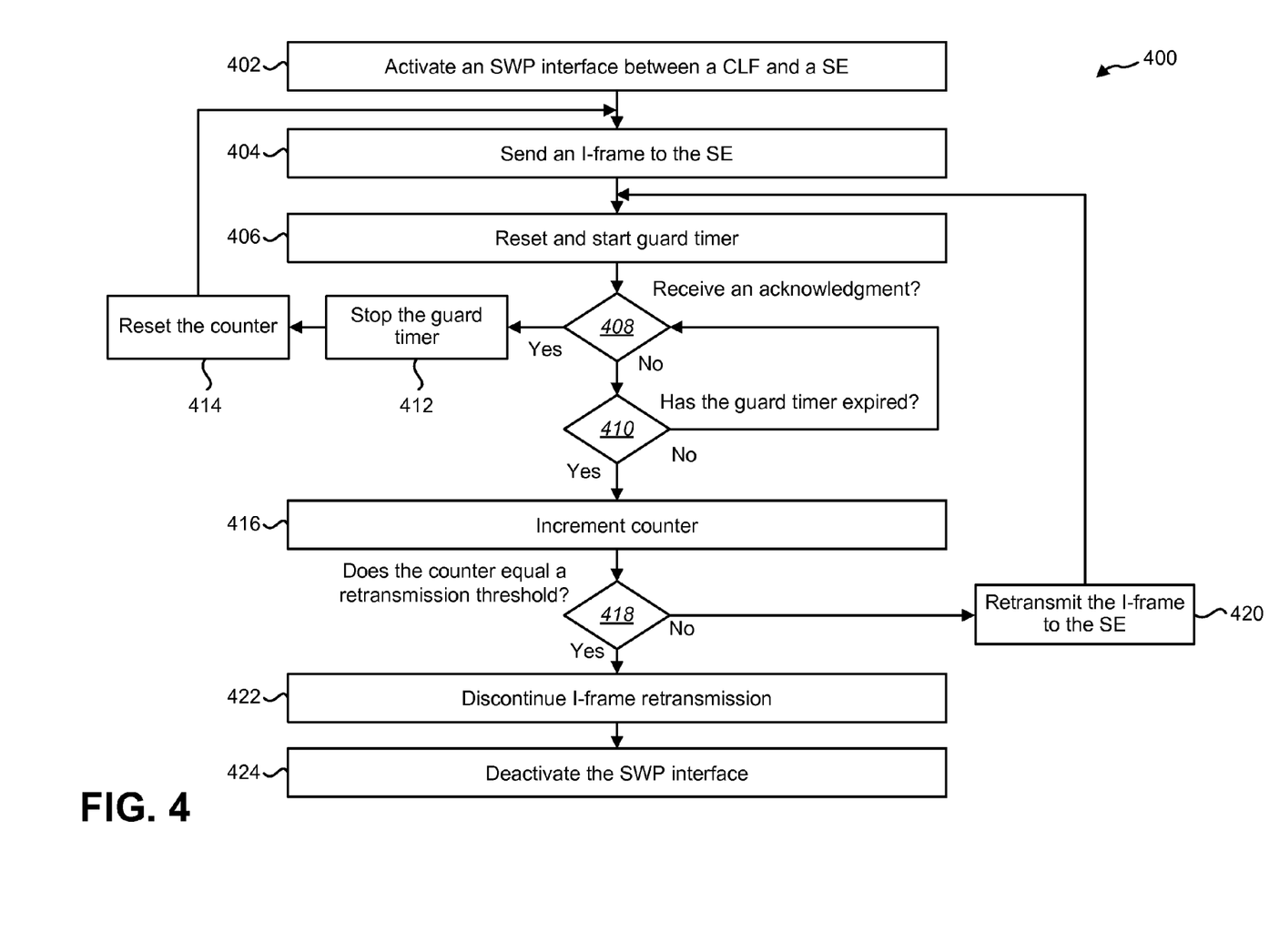
FIG. 4 is a flow diagram illustrating a detailed configuration of a method for mitigating effects of an unresponsive SE.

FIG. 4 is a flow diagram illustrating a detailed configuration of a method 400 for mitigating effects of an unresponsive SE 106. The method 400 may be implemented by a contactless front-end (CLF) 104. In one configuration, the CLF 104 may be an NFC chip. The CLF 104 may activate 402 a single wire protocol (SWP) interface 108 with the SE 106. The CLF 104 may then establish an SHDLC link with the SE 106. Upon activating the SWP interface 108, the CLF 104 may reset a counter 116 to zero. The counter 116 may count the number of successive I-frame retransmissions 118.

The CLF 104 may send 404 an I-frame 110 to the SE 106. The I-frame 110 may carry payload data to the SE 106. Upon sending an I-frame 110, the CLF 104 may reset 406 and start a guard timer 112. The guard timer 112 may be initialized with a guarding time 114.

The CLF 104 may determine 408 whether an acknowledgement 124 has been received from the SE 106. If an acknowledgment 124 has not been received, then the CLF 104 may determine 410 whether the guard timer 112 has expired. If the guard timer 112 has not expired, the CLF 104 may continue to wait to receive an acknowledgment 124. If the CLF 104 determines 408 that it has received an acknowledgment 124, the CLF 104 may stop 412 the guard timer 112 and reset 414 the counter 116 (e.g., set the counter 116 to zero). The CLF 104 may then send 404 another I-frame 110 to the SE 106.

If the CLF 104 determines 410 that the guard timer 112 has expired without receiving an acknowledgment 124, the CLF 104 may increment the counter 116. For example, the SE 106 may become unresponsive due to being removed or locked up and the CLF 104 may not receive an acknowledgment 124. For a first I-frame retransmission, the counter 116 may be set to 1. For a second successive I-frame retransmission, the counter 116 may be set to 2, and so on.

The CLF 104 may determine 418 whether the counter 116 equals a retransmission threshold 120. The retransmission threshold 120 may be a configurable integer value. The CLF 104 may compare the counter 116 with the retransmission threshold 120. If the counter 116 is less than the retransmission threshold 120, then the CLF 104 may retransmit 420 the I-frame 110 to the SE 106. The CLF 104 may then reset 406 and start the guard timer 112. The CLF 104 may wait for the guard timer 112 to expire and perform another iteration of incrementing 416 the counter 116 and retransmitting 420 the I-frame. If at any time the CLF 104 receives an acknowledgment 124, the CLF 104 may stop 412 the guard timer 112 and reset 414 the counter 116.

If the CLF 104 determines 418 that the counter 116 equals the retransmission threshold 120, then the CLF 104 may discontinue 422 I-frame 110 retransmission to the SE 106. If the counter 116 reaches the retransmission threshold 120, this may indicate that the SE 106 has become unresponsive.

The CLF 104 may deactivate 424 the SWP interface 108. In one configuration, the CLF 104 may interrupt the CLF firmware. The CLF 104 may notify the CLF firmware of an unresponsive SE condition. The CLF 104 may then deactivate 424 the SWP interface 108.

Figure 5:
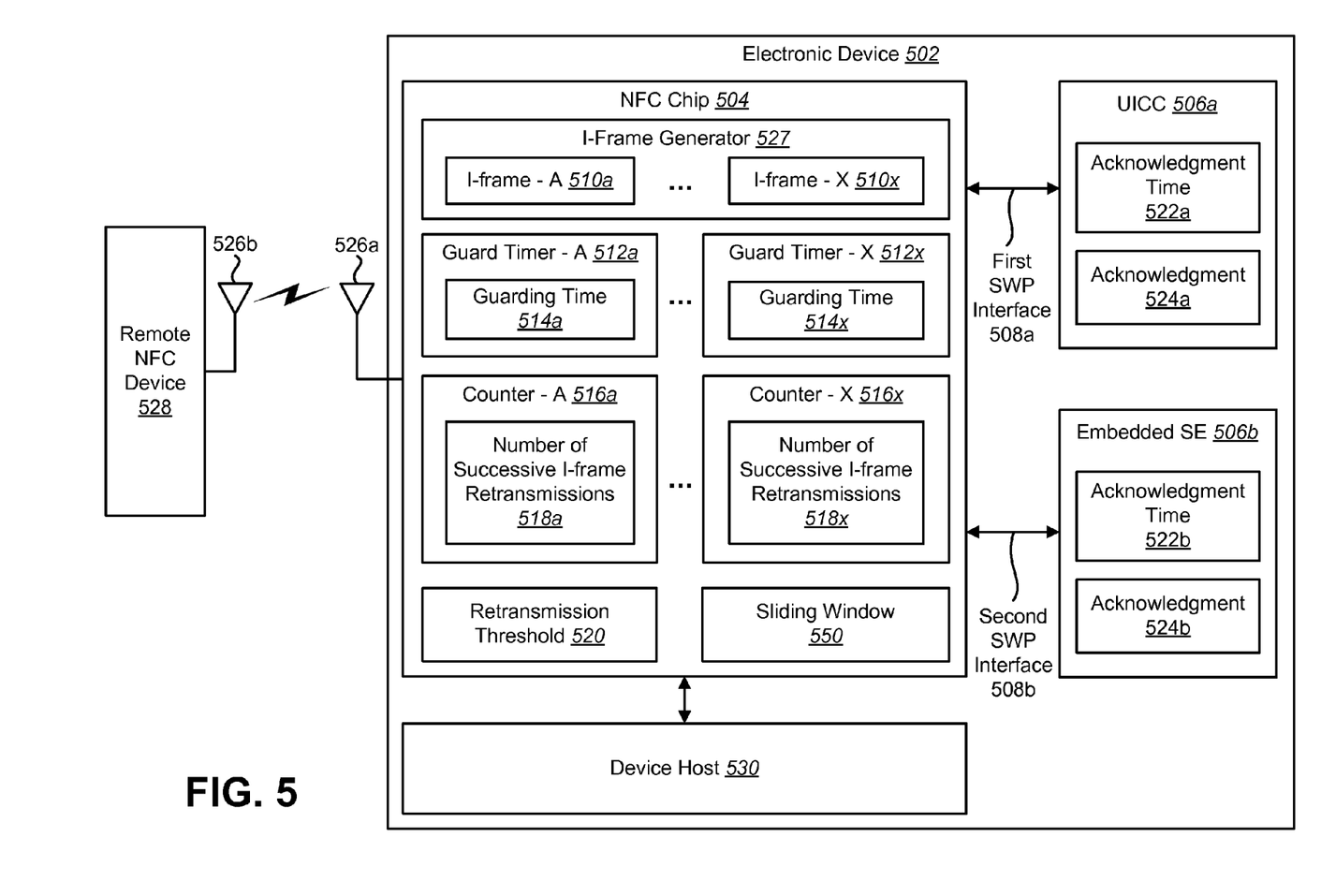
FIG. 5 is a block diagram illustrating another configuration of an electronic device in which systems and methods for mitigating effects of an unresponsive SE may be implemented.

FIG. 5 is a block diagram illustrating another configuration of an electronic device 502 in which systems and methods for mitigating effects of an unresponsive secure element (SE) 506 may be implemented. The electronic device 502 may be implemented in accordance with the electronic device 102 described in connection with FIG. 1.

The electronic device 502 may include a near-field communication (NFC) chip 504. The NFC chip 504 is one example of the contactless front-end (CLF) 104 described in connection with FIG. 1. The NFC chip may communicate with a remote device 528. The antenna 526a of the NFC chip 504 may be inductively coupled with an antenna 526b of the remote device 528. An example of NFC is described in connection with FIG. 6.

The NFC chip 504 may establish an interface between a device host 530 (also referred to as an application processor). In the case of NFC, the interface between the device host 530 and the NFC chip 504 may be an NFC controller interface (NCI) (also referred to as an NFC interface).

In the configuration illustrated in FIG. 5, the electronic device 502 includes at least two secure elements (SE) 506. A first secure element may be a universal integrated circuit card (UICC) 506a. The UICC 506a is an example of a removable SE 506. The UICC 506a may store subscriber details (e.g., credit card account numbers, transit accounts, and mobile phone details, etc.) and keeps these details separate and secure. Data is communicated between UICC 506a and the NFC chip 504 via a first SWP interface 508a.

A second secure element may be an embedded SE 506b. The embedded SE 506b may be integrated into the electronic device 102 and is not removable by a user. The embedded SEs 506b may communicate with the NFC chip 504 via a second SWP interface 508b. It should be noted that any number of secure elements may be included in the electronic device 502. Each of the secure elements may communicate with the NFC chip 504 via a separate SWP interface 508.

It should be noted that the two SWP interfaces 508a-b may not share any configurations between them. Parameters like window size, re-transmission thresholds, guard timer values, etc. are independent of each other and could be different. In one case, only one SWP interface 508 is active. There may be two SWP interface controllers inside the NFC chip 504 that autonomously talk to the SE 506 they are connected to with no bearing on the other.

As described above, the NFC chip 504 and SE 506 may exchange payload data using one or more I-frames 510. In one configuration, an I-Frame generator 527 may generate the one or more I-frames 510a-x to be transmitted to an SE 506. A maximum of 29 bytes of payload may be included in an I-frame 510. For a payload that is larger than 29 bytes, the payload may be fragmented and sent over multiple I-frames 510.

When the NFC chip 504 activates an SWP interface 508, the NFC chip 504 and the SE 506 may negotiate a sliding window 550. A sliding window 550 is used to send multiple I-frames 510a-x before receiving a confirmation (i.e., acknowledgment 524a or 524b) that the first I-frame 510a has been received correctly. This means that data may continue to flow in situations where there may be long turnaround time lags without stopping to wait for an acknowledgement 524. The sliding window 550 size may be lower than a default value due to limited resources. Therefore, an endpoint may ask the other endpoint to lower the sliding window 550 size.

The sliding window 550 size may be an x number of I-frames 510. In one configuration, the sliding window 550 may have a size of 2, 3 or 4 I-frames 510. For example, if two endpoints were to negotiate a sliding window 550 size of 2, then endpoint-A can send up to two I-frames 510 before endpoint-B actually acknowledges one or both I-frames 510. Therefore, an x number of I-frames 510 may be sent by the NFC chip 504 before receiving an acknowledgment 524 from an SE 506. As illustrated in FIG. 5, the number of I-frames 510 that are be sent by the NFC chip 504 before receiving an acknowledgment 524 may vary according to the sliding window 550 that is negotiated with an SE 506.

The NFC chip 504 may have guard timers 512a-x associated with each of the I-frames 510 that are sent. Therefore, the number of guard timers 512 may correspond to the x number of I-frames 510 of the sliding window 550. Each I-frame 510 sent by the NFC chip 504 may have a separate guard timer 512. The guard timers 512a-x may each be set with guarding times 514a-x (e.g., T2). The guarding times 514a-x may be configurable. If an I-frame 510 is not acknowledged within the guarding time 514, the NFC chip 504 may retransmit these I-frames 510. The guarding time 514 defines the time to wait after sending an I-frame 510 and retransmitting the I-frame 510.

In one example, the sliding window 550 is 2 I-frames 510 (i.e., x=2). Therefore, the NFC chip 504 may send two I-frames 510 before receiving an acknowledgment 524 from the SE 506. In this example, the NFC chip 504 may start a first guard timer 512a upon sending a first I-frame-A 510a. The NFC chip 504 may start a second guard timer 512b upon sending a second I-frame-B 510b.

The NFC chip 504 may wait to receive an acknowledgment 524 from the SE 506 before sending another I-frame 510. Each of the SEs 506a-b may be configured with an acknowledgment time 522a-b in which to send an acknowledgment 524a-b to the NFC chip 504. The NFC chip 504 may receive a single acknowledgment 524 for one, some or all of the I-frames 510. The corresponding guard timer(s) 512 are disabled and reset when an acknowledgment 524 is received from the SE 506.

As described above, problems may occur when the NFC chip 504 sends one or more I-frames 510 to an SE 506, but the SE 506 becomes unresponsive before sending an acknowledgment 524. To mitigate the effects of an unresponsive SE 506, the electronic device 502 may maintain multiple counters 516a-x associated with the multiple I-frames 510a-x that are transmitted by the NFC chip 504 to the SE 506. Each I-frame 510 may be associated with a separate counter 516 that counts the number of successive I-frame 510 retransmissions due to a guard timer 512 expiring. When a guard timer 512 expires, the counter 516 associated with that guard timer 512 may increment. Therefore, the counter 516 may correspond to the number of successive I-frame retransmissions 518.

In the case where the sliding window 550 size is 2 I-frames 510, the NFC chip 504 may have a first counter 516a that counts the number of successive I-frame retransmissions 518a due to the first guard timer 512a expiring. The NFC chip 504 may also have a second counter 516b that counts the number of successive I-frame retransmissions 518b due to the second guard timer 512b expiring.

In one configuration, all of the multiple counters 516a-x may be reset to zero when the SE 506 acknowledges any one of the multiple I-frames 510. In another configuration, only the counter 516 associated with an acknowledged I-frame 510 may be reset to zero, while the counters 516 associated with unacknowledged I-frames 510 may not be reset. Both cases are possible depending on how many I-frames 510 are acknowledged by an acknowledgement frame sent by the SE 506. The acknowledgement frame has the number of the next I-frames 510 that it is ready to receive. Therefore, all frames before that may be considered acknowledged.

In one example, the sliding window 550 size is four. In this example, the NFC chip 504 may stop sending I-frames 510 after sending four I-frames 510 (e.g., I-frames(0-3)). The SE 506 may send an acknowledgment (e.g., an RR frame) after an acknowledge timeout and acknowledge all four I-frames 510. By sending RR(4), the SE 506 is indicating that it is ready to receive I-frame(4) and thus acknowledges I-frames(0-3) implicitly. In this example, when RR(4) is received by the NFC chip 504, all four guard timers 512 for I-frames(0-3) will be reset/stopped.

Whenever any one of the counters 516a-x increments due to a guard timer 512 expiring, the NFC chip 504 may compare the value of the counter 516 to a retransmission threshold 520. If the counter 516 is less than the retransmission threshold 520, the NFC chip 504 may continue to retransmit the corresponding I-frame. If the counter 516 equals the retransmission threshold 520, then the NFC chip 504 may discontinue I-frame 510 retransmission for each of the I-frames 510a-x. Therefore, the NFC chip 504 may discontinue I-frame 510 retransmission if at least one of the multiple counters 516 equals the retransmission threshold 520. The retransmission threshold 520 may be configurable.

The NFC chip 504 may also deactivate the SWP interface 508 when at least one of the multiple counters 516 equals the retransmission threshold 520. If a counter 516 reaches the retransmission threshold 520, this may indicate that the SE 506 has become unresponsive. In one configuration, the NFC chip 504 may interrupt the CLF firmware. The NFC chip 504 may notify the CLF firmware of an unresponsive SE condition. The NFC chip 504 may then deactivate the SWP interface 508.

Figure 6:
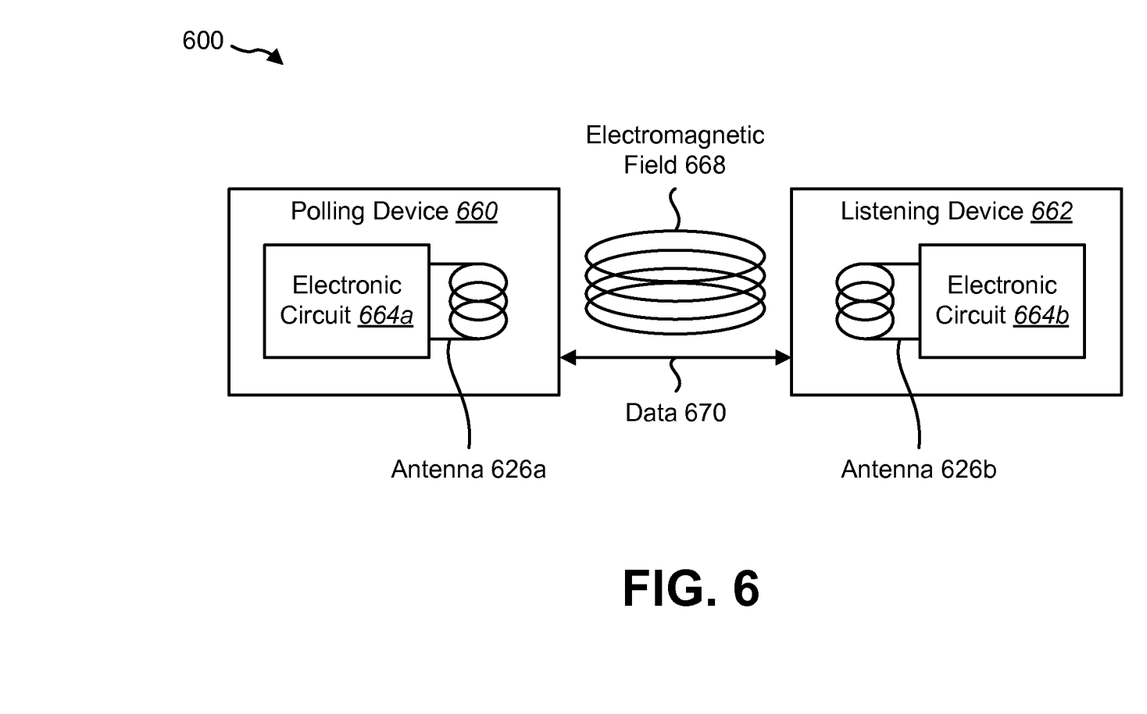
FIG. 6 is a block diagram illustrating one configuration of near-field communication (NFC) in a wireless communication system.

FIG. 6 is a block diagram illustrating one configuration of near-field communication (NFC) in a wireless communication system 600. A polling device 660 and a listening device 662 may operate according to NFC protocols. The polling device 660 and the listening device 662 may be implemented according to electronic device 102 described in connection with FIG. 1. In other words, the electronic device 102 described in connection with FIG. 1 may operate as either a polling device 660 a listening device 662 or both.

Each device 660, 662 may include an antenna 626a-b connected to an electronic circuit 664a-b. During operation, the combination of two NFC devices (i.e., the polling device 660 and listening device 662) may behave like a transformer.

NFC is an inductive coupling communication technology. The two NFC-capable devices 660, 662 may be separated by a distance. An alternating current may pass through a primary coil (i.e., the polling device antenna 626a) and create an electromagnetic field 668 (which may also be referred to as a radio frequency (RF) field or radiated field). The electromagnetic field 668 may induce a current in the secondary coil (i.e., the listening device antenna 626b). The listening device 662 may use the electromagnetic field 668 transmitted by the polling device 660 to power itself.

The configuration and tuning of both antennas 626a-b may determine the coupling efficiency from one device to the other device. During certain NFC transactions, the listening device 662 may function as a target, which is a role defined in the NFC standards.

In one configuration, the NFC transmitter of one device and the NFC receiver of the other device are configured according to a mutual resonant relationship. When the resonant frequency of the NFC receiver and the resonant frequency of the NFC transmitter are very close, transmission losses between the NFC transmitter and the NFC receiver are minimal when the NFC receiver is located in the "near-field" of the radiated field.

An NFC device may include an NFC loop antenna 626. The NFC loop antenna 626 may provide a means for energy transmission and reception. As stated, an efficient energy transfer may occur by coupling a large portion of the energy in the near-field of a transmitting antenna 626 to a receiving antenna 626 rather than propagating most of the energy in an electromagnetic wave to the far field.

An NFC-capable device may obtain sufficient data 670 to allow for communications to be established. One form of communications that may be established is an international standards organization data exchange protocol (ISO-DEP) communication link. Communications between the NFC devices may be enabled over a variety of NFC radio frequency (RF) technologies, including but not limited to, NFC-A, NFC-B, etc.

Figure 7:
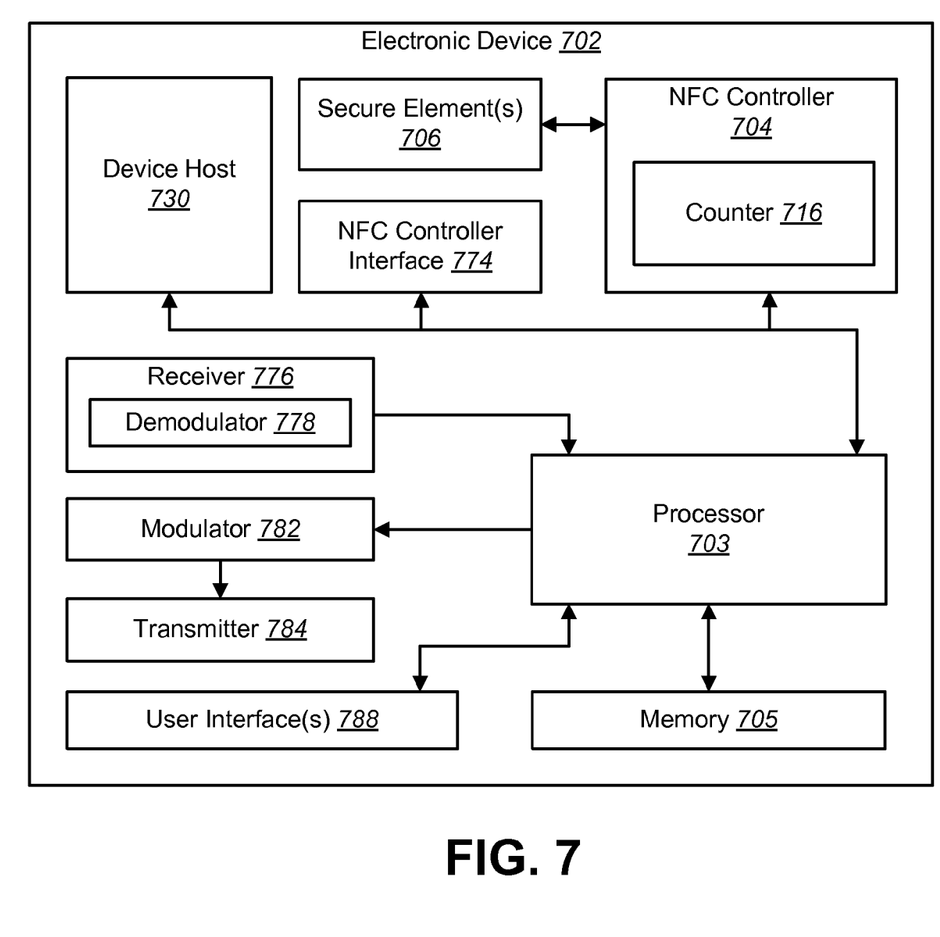
FIG. 7 is a block diagram illustrating another more specific configuration of an electronic device in which systems and methods for mitigating effects of an unresponsive SE may be implemented.

FIG. 7 is a block diagram illustrating another more specific configuration of an electronic device 702 in which systems and methods for mitigating effects of an unresponsive secure element (SE) 706 may be implemented. The components included within the electronic device 702 may be examples of corresponding components described above in connection with one or more of FIGS. 1, 3, 5 and 6.

As depicted in FIG. 7, the electronic device 702 includes a receiver 776 that receives a signal from, for instance, a receive antenna (not shown), performs typical actions on (e.g., filters, amplifies, downconverts, etc.) the received signal, and digitizes the conditioned signal to obtain samples. The receiver 776 can comprise a demodulator 778 that can demodulate received symbols and provide them to a processor 703 for channel estimation. The processor 703 can be a processor dedicated to analyzing information received by the receiver 776 and/or generating information for transmission by the transmitter 784, a processor that controls one or more components of the electronic device 702, and/or a processor that analyzes information received by the receiver 776, generates information for transmission by the transmitter 784 and controls one or more components of the electronic device 702. Further, signals may be prepared for transmission by the transmitter 784 through the modulator 782, which may modulate the signals processed by the processor 703.

The electronic device 702 can additionally comprise memory 705 that is operatively coupled to the processor 703 and that can store data to be transmitted, received data, information related to available channels, transmission control protocol (TCP) flows, data associated with analyzed signal and/or interference strength, information related to an assigned channel, power, rate or the like, and any other suitable information for estimating a channel and communicating via the channel.

Further, the processor 703, receiver 776, transmitter 784, NFC controller 704, and/or the device host 730 may perform one or more of the functions described above in connection with FIGS. 1-6. It will be appreciated that the data store (e.g., memory 705) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 705 of the subject systems and methods may comprise, without being limited to, these and any other suitable types of memory.

In another aspect, the electronic device 702 may include an NFC controller interface (NCI) 774. In an aspect, the NCI 774 may be operable to enable communications between the device host 730 and the NFC controller 704.

The electronic device 702 may include an NFC controller 704. The NFC controller 704 is one example of a contactless front-end (CLF) 104, as described in connection with FIG. 1. The NFC controller 704 may communicate with one or more secure elements (SEs) 706. The NFC controller 704 may include one or more counters 716 that counts the number of successive I-frame retransmissions in order to discontinue I-frame retransmission and deactivate an SWP interface 108 with an unresponsive SE 706.

In an aspect, the NFC controller 704 may be operable to obtain, through the NCI 774, information from other devices, such as a remote NFC device 528. During ISO-DEP communication, the NFC controller 704 may operate using a frame RF interface or an ISO-DEP interface. When operating using the ISO-DEP interface, the NFC controller 704 may be operable to change various parameters associated with communications between the device host 730 and a remote NFC device 528 using a data exchange change module.

In some configurations, the NFC controller 704 may act as a relay and communicate messages between the device host 730 and a remote NFC device 528. For example, the device host 730 may extract data from messages exchanged with the remote NFC device 528. Communications may prompt the NFC controller 704 to change various data. The NFC controller 704 may update received parameters and/or may store parameters in memory.

Additionally, the electronic device 702 may include one or more user interfaces 788. The user interface(s) 788 may include input mechanism(s) for generating inputs into the electronic device 702 and/or output mechanism(s) for generating information for consumption by the user of the electronic device 702. For example, input mechanism(s) may include a mechanism such as a key or keyboard, a mouse, a touch-screen display, a microphone, etc. Further, for example, output mechanism(s) may include a display, an audio speaker, a haptic feedback mechanism, a Personal Area Network (PAN) transceiver etc. In the illustrated aspects, the output mechanism may include a display operable to present media content that is in image or video format or an audio speaker to present media content that is in an audio format.

Figure 8:
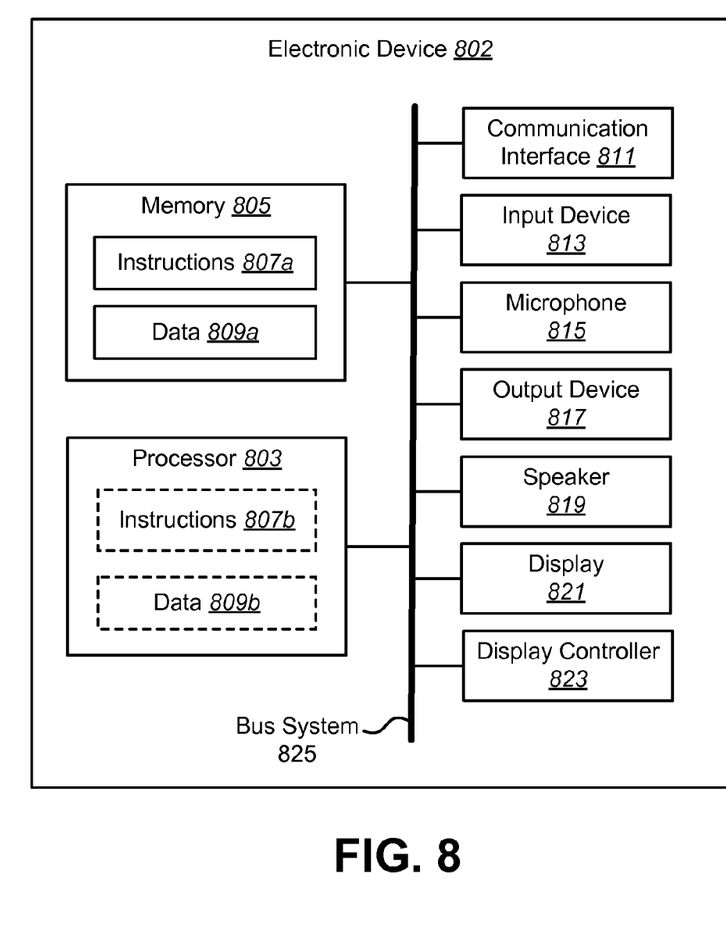
FIG. 8 illustrates various components that may be utilized in an electronic device.

FIG. 8 illustrates various components that may be utilized in an electronic device 802. The illustrated components may be located within the same physical structure or in separate housings or structures. The electronic device 802 described in connection with FIG. 8 may be implemented in accordance with one or more of the electronic devices 102, 502 described herein.

The electronic device 802 includes a processor 803. The processor 803 may be a general purpose single- or multi-chip microprocessor (e.g., an advanced RISC machine (ARM)), a special purpose microprocessor (e.g., a digital signal processor (DSP)), a microcontroller, a programmable gate array, etc. The processor 803 may be referred to as a central processing unit (CPU). Although just a single processor 803 is shown in the electronic device 802 of FIG. 8, in an alternative configuration, a combination of processors 803 (e.g., an ARM and DSP) could be used.

The electronic device 802 also includes memory 805 in electronic communication with the processor 803. That is, the processor 803 may read information from and/or write information to the memory 805. The memory 805 may be any electronic component capable of storing electronic information. The memory 805 may be random access memory (RAM), read-only memory (ROM), magnetic disk storage media, optical storage media, flash memory devices in RAM, on-board memory included with the processor 803, programmable read-only memory (PROM), erasable programmable read-only memory (EPROM), electrically erasable PROM (EEPROM), registers, and so forth, including combinations thereof.

Data 809a and instructions 807a may be stored in the memory 805. The instructions 807a may include one or more programs, routines, sub-routines, functions, procedures, etc. The instructions may include a single computer-readable statement or many computer-readable statements. The instructions 807a may be executable by the processor 803 to implement one or more of the methods, functions and procedures described above. Executing the instructions may involve the use of the data 809a that is stored in the memory 805. FIG. 8 shows some instructions 807b and data 809b being loaded into the processor 803 (which may come from instructions 807a and data 809a that are stored in the memory 805).

The electronic device 802 may also include one or more communication interfaces 811 for communicating with other electronic devices. The communication interfaces 811 may be based on wired communication technology, wireless communication technology, or both. Examples of different types of communication interfaces 811 include a serial port, a parallel port, a Universal Serial Bus (USB), an Ethernet adapter, an Institute of Electrical and Electronics Engineers (IEEE) 1394 bus interface, a near-field communication (NFC) transceiver, a small computer system interface (SCSI) bus interface, an infrared (IR) communication port, a Bluetooth wireless communication adapter, a 3rd Generation Partnership Project (3GPP) transceiver, an IEEE 802.11 ("Wi-Fi") transceiver and so forth. For example, the communication interface 811 may be coupled to one or more antennas (not shown) for transmitting and receiving wireless signals.

The electronic device 802 may also include one or more input devices 813 and one or more output devices 817. Examples of different kinds of input devices 813 include a keyboard, mouse, microphone 815, remote control device, button, joystick, trackball, touchpad, lightpen, etc. For instance, the electronic device 802 may include one or more microphones 815 for capturing acoustic signals. In one configuration, a microphone 815 may be a transducer that converts acoustic signals (e.g., voice, speech) into electrical or electronic signals. Examples of different kinds of output devices 817 include a speaker 819, printer, etc. For instance, the electronic device 802 may include one or more speakers 819. In one configuration, a speaker 819 may be a transducer that converts electrical or electronic signals into acoustic signals. One specific type of output device 817 that may be typically included in an electronic device 802 is a display 821 device. Display 821 devices used with configurations disclosed herein may utilize any suitable image projection technology, such as a cathode ray tube (CRT), liquid crystal display (LCD), light-emitting diode (LED), gas plasma, electroluminescence, or the like. A display controller 823 may also be provided, for converting data stored in the memory 805 into text, graphics, and/or moving images (as appropriate) shown on the display 821 device.

The various components of the electronic device 802 may be coupled together by one or more buses, which may include a power bus, a control signal bus, a status signal bus, a data bus, etc. For simplicity, the various buses are illustrated in FIG. 8 as a bus system 825. It should be noted that FIG. 8 illustrates only one possible configuration of an electronic device 802. Various other architectures and components may be utilized.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 2 and FIG. 4, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method, comprising:
counting a number of successive retransmissions of an information frame (I-frame) that occur due to a guard timer expiring, wherein a contactless front-end (CLF) transmits an I-frame to a secure element (SE) over a single wire protocol (SWP) interface; and
when the count equals a retransmission threshold:
discontinuing I-frame retransmission,
deactivating the SWP interface,
triggering an interrupt of CLF firmware, and
notifying the CLF firmware of an unresponsive condition.

2. The method of claim 1, wherein counting the number of successive retransmissions of an I-frame comprises incrementing the count for each successive retransmission of an I-frame.

3. The method of claim 2, further comprising resetting the count to zero when the SE acknowledges an I-frame.

4. The method of claim 1, wherein the retransmission threshold is configurable.

5. The method of claim 1, wherein the guard timer expires when the CLF fails to receive an I-frame acknowledgement from the SE within a guarding time.

6. The method of claim 1, further comprising maintaining multiple counts associated with multiple I-frames that are transmitted by the CLF to the SE, wherein each of the multiple I-frames has a separate count for the number of successive retransmissions of an I-frame due to a guard timer expiring.

7. The method of claim 6, further comprising discontinuing retransmission of I-frames and deactivating the SWP interface when at least one of the multiple counts equals the retransmission threshold.

8. The method of claim 6, further comprising resetting the multiple counts to zero when the SE acknowledges any one of the multiple I-frames.

9. The method of claim 1, wherein the CLF comprises a near-field communication (NFC) chip, and wherein the SE comprises at least one of a universal integrated circuit card (UICC) and an embedded SE.

10. The method of claim 1, wherein an I-frame is sent over the SWP interface using simplified high level data link control (SHDLC) link layer control (LLC).

11. An electronic device, comprising:
a processor;
memory in electronic communication with the processor; and
instructions stored in the memory, the instructions being executable by the processor to:
maintain a counter that counts a number of successive retransmissions of an information frame (I-frame) that occur due to a guard timer expiring, wherein a contactless front-end (CLF) transmits an I-frame to a secure element (SE) over a single wire protocol (SWP) interface; and
when the counter equals a retransmission threshold:
discontinue I-frame retransmission,
deactivate the SWP interface,
trigger an interrupt of CLF firmware, and
notify the CLF firmware of an unresponsive condition.

12. The electronic device of claim 11, wherein the instructions executable to maintain the counter that counts the number of successive retransmissions of an I-frame comprise instructions executable to increment the counter for each successive retransmission of an I-frame.

13. The electronic device of claim 12, further comprising instructions executable to reset the counter to zero when the SE acknowledges an I-frame.

14. The electronic device of claim 11, further comprising instructions executable to maintain multiple counters associated with multiple I-frames that are transmitted by the CLF to the SE, wherein each I-frame has a separate counter that counts the number of successive retransmissions of an I-frame due to a guard timer expiring.

15. The electronic device of claim 14, further comprising instructions executable to discontinue retransmission of I-frames and deactivate the SWP interface when at least one of the multiple counters equals the retransmission threshold.

16. The electronic device of claim 14, further comprising instructions executable to reset the multiple counters to zero when the SE acknowledges any one of the multiple I-frames.

17. An apparatus, comprising:
means for counting a number of successive retransmissions of an information frame (I-frame) that occur due to a guard timer expiring, wherein a contactless front-end (CLF) transmits an I-frame to a secure element (SE) over a single wire protocol (SWP) interface; and
when the count equals a retransmission threshold:
means for discontinuing I-frame retransmission;
means for deactivating the SWP interface,
means for triggering an interrupt of CLF firmware, and
means for notifying the CLF firmware of an unresponsive condition.

18. The apparatus of claim 17, wherein the means for counting the number of successive retransmissions of an I-frame comprise means for incrementing the count for each successive retransmission of an I-frame.

19. The apparatus of claim 18, further comprising means for resetting the count to zero when the SE acknowledges an I-frame.

20. The apparatus of claim 17, further comprising means for maintaining multiple counts associated with multiple I-frames that are transmitted by the CLF to the SE, wherein each of the multiple I-frames has a separate count for the number of successive retransmissions of an I-frame s due to a guard timer expiring.

21. The apparatus of claim 20, further comprising means for discontinuing retransmission of I-frames and deactivating the SWP interface when at least one of the multiple counts equals the retransmission threshold.

22. The apparatus of claim 20, further comprising means for resetting the multiple counts to zero when the SE acknowledges any one of the multiple I-frames.

23. A computer-program product, the computer-program product comprising a non-transitory computer-readable medium having instructions thereon, the instructions comprising:
code for causing a computer to count a number of successive retransmissions of an information frame (I-frame) that occur due to a guard timer expiring, wherein a contactless front-end (CLF) transmits an I-frame to a secure element (SE) over a single wire protocol (SWP) interface; and
when the count equals a retransmission threshold:
code for causing the computer to discontinue I-frame retransmission, code for causing the computer to deactivate the SWP interface,
code for causing the computer to trigger an interrupt of CLF firmware, and code for causing the computer to notify the CLF firmware of an unresponsive condition.

24. The computer-program product of claim 23, wherein the code for causing the computer to count the number of successive retransmissions of an I-frame comprises code for causing the computer to increment the count for each successive retransmission of an I-frame.

25. The computer-program product of claim 24, further comprising code for causing the computer to reset the count to zero when the SE acknowledges an I-frame.

26. The computer-program product of claim 23, further comprising code for causing the computer to maintain multiple counts associated with multiple I-frames that are transmitted by the CLF to the SE, wherein each of the multiple I-frames has a separate count for the number of successive retransmissions of an I-frame due to a guard timer expiring.

27. The computer-program product of claim 26, further comprising code for causing the computer to discontinue I-frame retransmission of I-frames and deactivate the SWP interface when at least one of the multiple counts equals the retransmission threshold.

28. The computer-program product of claim 26, further comprising code for causing the computer to reset the multiple counts to zero when the SE acknowledges any one of the multiple I-frames.

* * * * *